United States Patent [19]

Rathbun et al.

[11] 4,245,263
[45] Jan. 13, 1981

[54] WRITE PRECOMPENSATION AND WRITE ENCODING FOR FM AND MFM RECORDING

[75] Inventors: Donald J. Rathbun, Andover, Mass.; Peter P. Campbell, Nashua, N.H.

[73] Assignee: Honeywell Information Systems Inc., Waltham, Mass.

[21] Appl. No.: 39,054

[22] Filed: May 14, 1979

[51] Int. Cl.³ .............................................. G11B 5/09
[52] U.S. Cl. ........................................ 360/45; 360/43
[58] Field of Search ................................ 360/45, 43

[56] References Cited

U.S. PATENT DOCUMENTS

| 3,879,342 | 4/1975 | Pzrel | 360/45 |
| 4,000,512 | 12/1976 | Lau | 360/45 |
| 4,000,513 | 12/1976 | Precourt | 360/45 |

*Primary Examiner*—Vincent P. Canney
*Attorney, Agent, or Firm*—George Grayson; Nicholas Prasinos; Ronald T. Reiling

[57] ABSTRACT

Information to be written in the form of magnetic flux reversals on the surface of a disk or diskette is applied in serial fashion to a first shift register. The parallel outputs of the shift register address a PROM. The PROM output is applied to a second shift register in the form of clock and data bits to be written on the disk or diskette magnetic surface. Control signals applied to the PROM address terminals select the mode, FM or MFM, the address mark or if precompensation is required.

7 Claims, 9 Drawing Figures

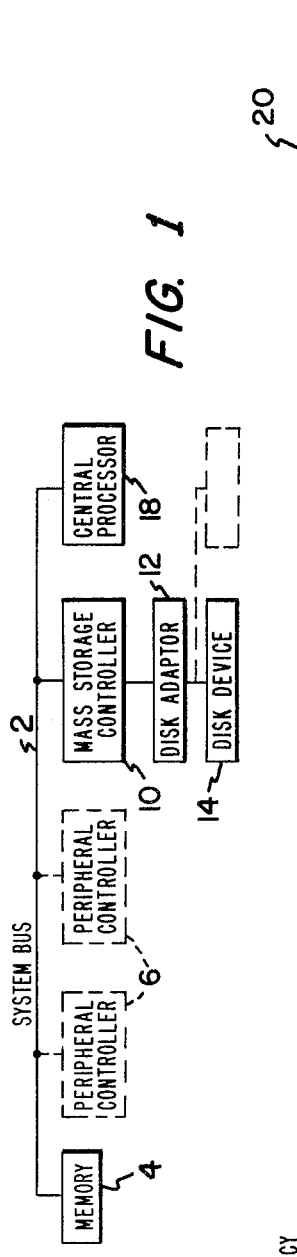
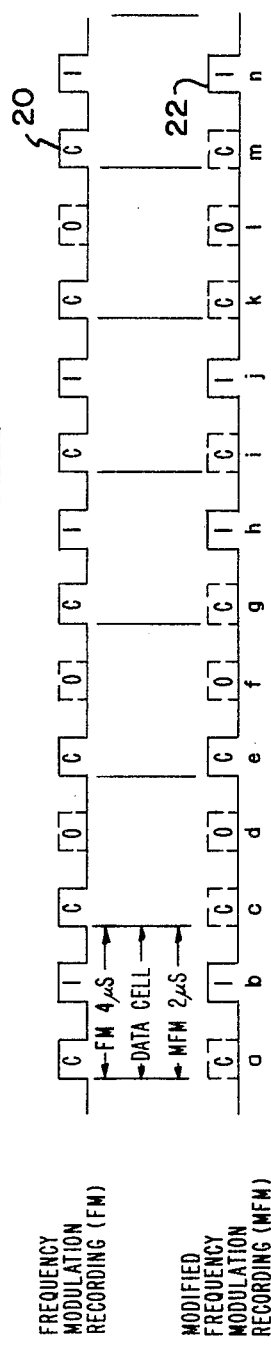
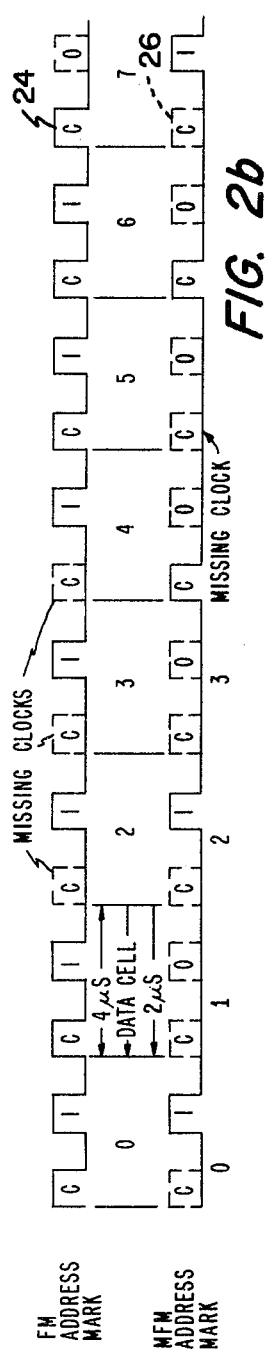
FIG. 1
FIG. 2a
FIG. 2b

CONTENTS OF PROM 60-ADDRESS LOCATIONS

| | ADDRESS LOCATIONS (DECIMAL) | STRTWRT+00 (START WRITE) | MFMLDT+00 (LATE DATA) | MFMDAT+00 (DATA) | MFMEDT+00 (EARLY DATA) | | ADDRESS LOCATIONS (DECIMAL) | STRTWRT+00 (START WRITE) | MFMLDT+00 (LATE DATA) | MFMDAT+00 (DATA) | MFMEDT+00 (EARLY DATA) |
|---|---|---|---|---|---|---|---|---|---|---|---|
| FM | 0- 31 | 0 | 0 | 0 | 0 | | 364-367 | 0 | 0 | 0 | 1 |
| | 32- 63 | 0 | 0 | 1 | 0 | | 368-375 | 0 | 0 | 0 | 0 |
| | 64- 95 | 0 | 0 | 0 | 0 | | 376-379 | 0 | 1 | 0 | 0 |
| | 96-127 | 0 | 0 | 1 | 0 | | 380-383 | 0 | 0 | 1 | 0 |
| | 128 | 1 | 0 | 0 | 0 | | 384 | 1 | 0 | 0 | 0 |
| | 129-159 | 0 | 0 | 0 | 0 | | 385-391 | 0 | 0 | 0 | 0 |
| | 160-191 | 0 | 0 | 1 | 0 | | 392-399 | 0 | 0 | 1 | 0 |
| | 192 | 1 | 0 | 0 | 0 | | 400-407 | 0 | 0 | 0 | 0 |
| | 193-223 | 0 | 0 | 0 | 0 | | 408-415 | 0 | 0 | 1 | 0 |
| | 224-255 | 0 | 0 | 1 | 0 | | 416-423 | 0 | 0 | 0 | 0 |
| MFM | 256-263 | 0 | 0 | 0 | 0 | | 424-431 | 0 | 0 | 1 | 0 |
| | 264-271 | 0 | 0 | 1 | 0 | | 432-439 | 0 | 0 | 0 | 0 |
| | 272-279 | 0 | 0 | 0 | 0 | MFM | 440-447 | 0 | 0 | 1 | 0 |
| | 280-287 | 0 | 0 | 1 | 0 | | 448 | 1 | 0 | 0 | 0 |
| | 288-295 | 0 | 0 | 0 | 0 | | 449-455 | 0 | 0 | 0 | 0 |
| | 296-303 | 0 | 0 | 1 | 0 | | 456-459 | 0 | 0 | 1 | 0 |
| | 304-311 | 0 | 0 | 0 | 0 | | 460-463 | 0 | 0 | 0 | 1 |
| | 312-319 | 0 | 0 | 1 | 0 | | 464-471 | 0 | 0 | 0 | 0 |
| | 320-327 | 0 | 0 | 0 | 0 | | 472-475 | 0 | 1 | 0 | 0 |
| | 328-331 | 0 | 0 | 1 | 0 | | 476-479 | 0 | 0 | 1 | 0 |
| | 332-335 | 0 | 0 | 0 | 1 | | 480-487 | 0 | 0 | 0 | 0 |
| | 336-343 | 0 | 0 | 0 | 0 | | 488-491 | 0 | 0 | 1 | 0 |
| | 344-347 | 0 | 1 | 0 | 0 | | 492-495 | 0 | 0 | 0 | 1 |
| | 348-351 | 0 | 0 | 1 | 0 | | 496-503 | 0 | 0 | 0 | 0 |
| | 352-359 | 0 | 0 | 0 | 0 | | 504-507 | 0 | 1 | 0 | 0 |
| | 360-363 | 0 | 0 | 1 | 0 | | 508-511 | 0 | 0 | 1 | 0 |

FIG. 4

CONTENTS OF PROM 62-ADDRESS LOCATIONS

| | ADDRESS LOCATIONS (DECIMAL) | MFMMCK+00 (MISSING CLOCK) | MFMLCK+00 (LATE CLOCK) | MFMCLK+00 (CLOCK) | MFMECK+00 (EARLY CLOCK) | | ADDRESS LOCATIONS (DECIMAL) | MFMMCK+00 (MISSING CLOCK) | MFMLCK+00 (LATE CLOCK) | MFMCLK+00 (CLOCK) | MFMECK+00 (EARLY CLOCK) |
|---|---|---|---|---|---|---|---|---|---|---|---|
| FM | 0-183 | 0 | 0 | 1 | 0 | | 352-353 | 0 | 0 | 1 | 0 |
| | 184 | 1 | 0 | 0 | 0 | | 354-355 | 0 | 1 | 0 | 0 |
| | 185-187 | 0 | 0 | 1 | 0 | | 356-367 | 0 | 0 | 0 | 0 |
| | 188 | 1 | 0 | 0 | 0 | | 368-369 | 0 | 0 | 0 | 1 |
| | 189 | 0 | 0 | 1 | 0 | | 370-371 | 0 | 0 | 1 | 0 |
| | 190 | 1 | 0 | 0 | 0 | | 372-383 | 0 | 0 | 0 | 0 |
| | 191-247 | 0 | 0 | 1 | 0 | | 384-387 | 0 | 0 | 1 | 0 |
| | 248 | 1 | 0 | 0 | 0 | | 388-399 | 0 | 0 | 0 | 0 |
| | 249-251 | 0 | 0 | 1 | 0 | | 400-403 | 0 | 0 | 1 | 0 |
| | 252 | 1 | 0 | 0 | 0 | | 404-415 | 0 | 0 | 0 | 0 |
| | 253 | 0 | 0 | 1 | 0 | | 416 | 0 | 0 | 1 | 0 |
| | 254 | 1 | 0 | 0 | 0 | | 417 | 1 | 0 | 0 | 0 |
| | 255 | 0 | 0 | 1 | 0 | MFM | 418-419 | 0 | 0 | 1 | 0 |
| MFM | 256-259 | 0 | 0 | 1 | 0 | | 420-431 | 0 | 0 | 0 | 0 |
| | 260-271 | 0 | 0 | 0 | 0 | | 432-435 | 0 | 0 | 1 | 0 |
| | 272-275 | 0 | 0 | 1 | 0 | | 436-447 | 0 | 0 | 0 | 0 |
| | 276-287 | 0 | 0 | 0 | 0 | | 448-451 | 0 | 0 | 1 | 0 |
| | 288-291 | 0 | 0 | 1 | 0 | | 452-463 | 0 | 0 | 0 | 0 |
| | 292-303 | 0 | 0 | 0 | 0 | | 464-467 | 0 | 0 | 1 | 0 |
| | 304-307 | 0 | 0 | 1 | 0 | | 468-479 | 0 | 0 | 0 | 0 |
| | 308-319 | 0 | 0 | 0 | 0 | | 480 | 0 | 0 | 1 | 0 |
| | 320-321 | 0 | 0 | 1 | 0 | | 481 | 1 | 0 | 0 | 0 |
| | 322-323 | 0 | 1 | 0 | 0 | | 482-483 | 0 | 0 | 1 | 0 |
| | 324-335 | 0 | 0 | 0 | 0 | | 484-495 | 0 | 0 | 0 | 0 |
| | 336-337 | 0 | 0 | 0 | 1 | | 496-499 | 0 | 0 | 1 | 0 |
| | 338-339 | 0 | 0 | 1 | 0 | | 500-511 | 0 | 0 | 0 | 0 |
| | 340-351 | 0 | 0 | 0 | 0 | | | | | | |

FIG. 5

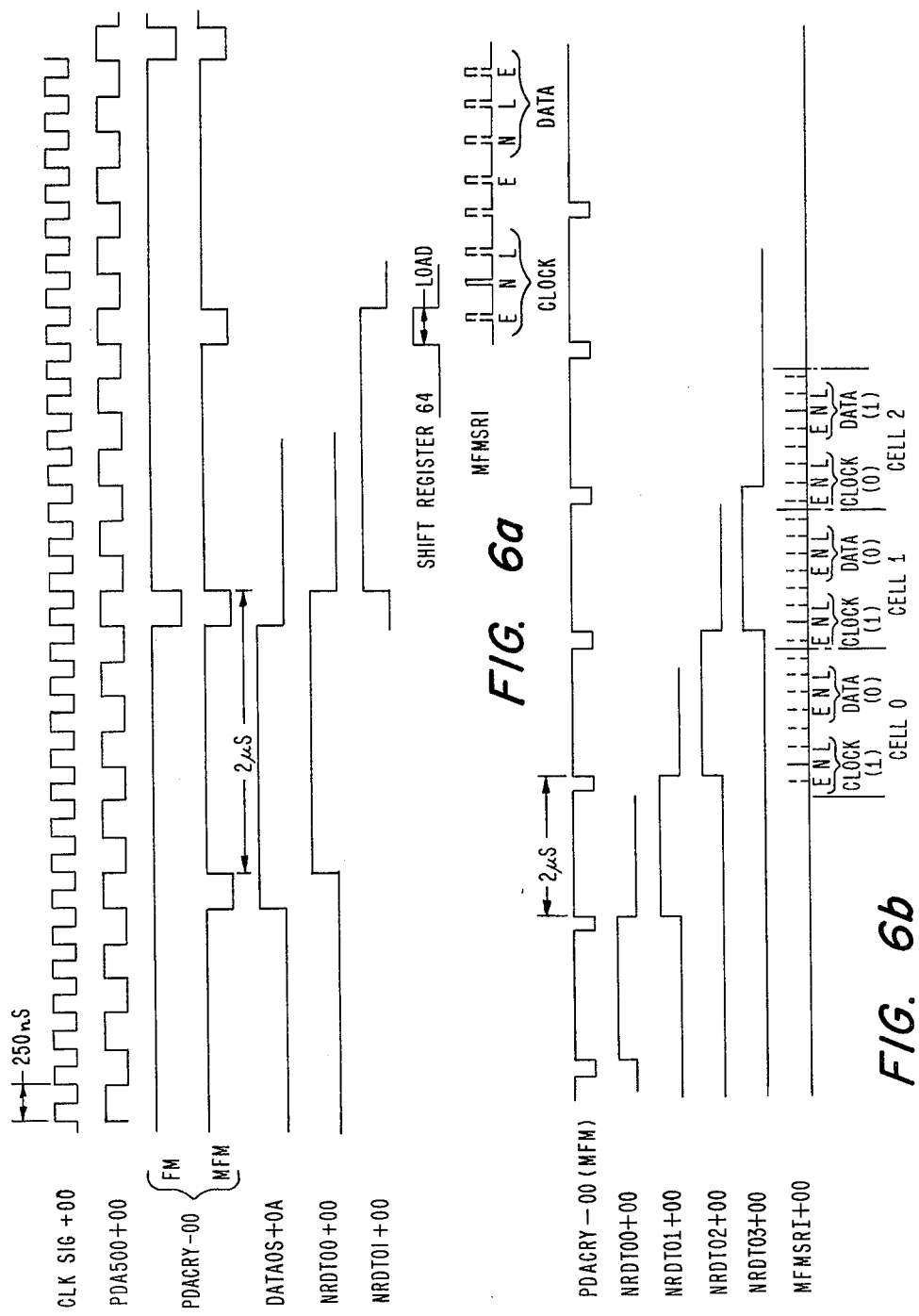

WRITE PRECOMPENSATION AND WRITE ENCODING FOR FM AND MFM RECORDING

RELATED APPLICATIONS

The following U.S. Patent Applications filed on an even date with the instant application and assigned to the same assignee as the instant application are related to the instant application.

1. Digital Read Recovery With Variable Frequency Compensation by Donald J. Rathbun and David B. O'Keefe and having U.S. Ser. No. 038,977.
2. Digital Frequency Modulation and Modified Frequency Modulation Read Recovery With Data Separation by Donald J. Rathbun and David B. O'Keefe and having U.S. Ser. No. 038,767.

BACKGROUND OF THE INVENTION

1. Field of the Invention

This invention relates generally to data processing systems and more specifically to apparatus for encoding information and shifting clock and data bits for writing on a magnetic surface such as a disk or diskette.

2. Prior Art

The need for higher density recording of digital information on a magnetic medium has fostered the development of numerous encoding schemes including both phase and frequency encoding. With increased data processing speeds placing greater emphasis on high density magnetic recording, resort has been had to frequency modulated (FM) and modified frequency modulated (MFM) binary information streams. The FM and MFM information streams are generally referred to as single density and double density encoded information, respectively.

FM or single density encoding is disclosed in U.S. Pat. No. 4,034,348 to Rathbun. Further, MFM or double density encoding has been disclosed in a Control Data Corporation project note entitled "MFM Double Density FDD System", and dated Nov. 16, 1976. Also disclosed therein is the occurrence of an illegal missing clock in the address mark field which serves as an address mark.

During the generation of FM and MFM encoded information, severe peak shifts may occur in the clock and data bits as a result of magnetic crowding, mechanical jitter and various electrical effects. The peak shift problem may be further aggravated during read recovery. Where the magnitude of the peak shift may be predicted, the encoded data may be precompensated prior to a recording.

The FM and MFM precompensation systems in general have been comprised of frequency sensitive devices such as delay lines, arrays of monostable multivibrators wherein the data stream is rearranged by moving the data bits into one or more flip-flops at a time, or multiphase clock sources.

The delay lines have exhibited a limited accuracy which is unacceptable in contemporary data processing systems, and are not compatible with integrated circuit implementation. Further, the arrays of monostable multivibrators and multiphase clock sources add unneeded complexity to the encoding system, and thereby increase the likelihood of mechanical jitter and electrical effects which cause peak shifts in the data stream.

U.S. Patent Application Ser. No. 862,258 entitled "Write Precompensation System is directed to a system" for precompensating MFM encoded information without the use of delay lines, flip-flop arrays or multiphase clocks. However this solution requires a relatively large number of integrated circuits. Also the precompensation is accomplished under a fixed set of rules.

It should be understood that the references cited herein are those which the applicants are aware and are presented to acquaint the reader with the level of skill in the art and may not be the closest references to the invention. No presentation is made that any search has been conducted by the applicants.

OBJECTS OF THE INVENTION

Accordingly it is a primary object of the invention to provide a data processing system with an improved peripheral subsystem.

It is an object of the invention to provide a data processing system with an improved mass storage subsystem.

It is another object of the invention to provide a mass storage subsystem having improved apparatus for writing in FM and MFM mode.

It is still another object of the invention to provide a mass storage subsystem having improved apparatus for precompensation of clock and data bits.

SUMMARY OF THE INVENTION

Information to be written on the magnetic surface of a disk or diskette in either a Frequency Modulation Mode (FM) or a Modified Frequency Modulation Mode (MFM) is stored in a First In-First Out Buffer Memory (FIFO). The information is read out serially from the FIFO into a shift register 38 whose parallel output is applied to the input address terminals of a clock Programmable Read Only Memory (PROM) and a data PROM.

A plurality of control signals are also applied to the input address terminals of the PROMs. These signals indicate if the system is writing in an FM or MFM mode, if the system is writing address marks, or if the system is writing on the inner tracks of the disk or diskette during the MFM mode thereby requiring precompensation.

The PROM outputs indicate the bit configuration of each cell if this is a start write or address mark operation, and the amount the clock or data bit is shifted if precompensation is required. The PROM output data and clock signals are applied to a shift register 64 and transferred in a serial manner to the device and written on the disk or diskette in conformance with the output timing of the shift register. The information written on the media includes zero characters, address mark characters, data characters and cyclic redundancy characters.

BRIEF DESCRIPTION OF THE DRAWINGS

The novel features which are characteristic of the invention are set forth with particularly in the appended claims. The invention itself, however, both as to organiation and operation may best be understood by reference to the following description in conjunction with the drawings in which, FIG. 1 is a block diagram of a typical system.
FIG. 2a shows typical clock and data configurations in the MFM and FM modes.
FIG. 2b shows address mark byte bit configurations in the MFM and FM modes.

FIG. 4 is a layout of the data information stored in the PROM address locations.

FIG. 5 is a layout of the clock information stored in the PROM address locations.

FIGS. 6a and 6b are timing diagrams showing a typical operation when writing information in the MFM mode.

DESCRIPTION OF THE PREFERRED EMBODIMENT

Figure 3A:
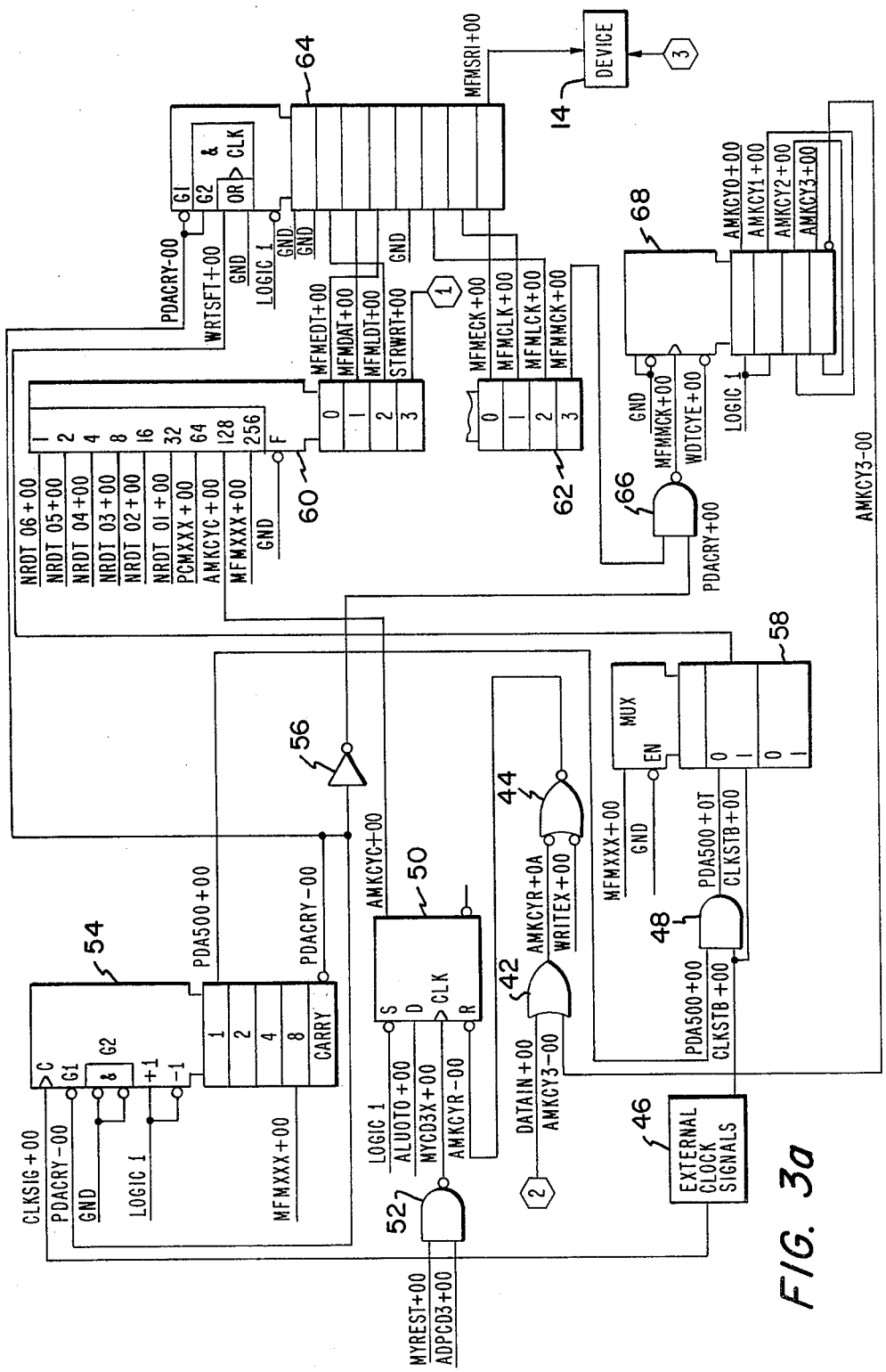
FIG. 3 is a detailed logic diagram of the preferred embodiment.

FIG. 1 shows a typical Honeywell Level 6 Minicomputer System comprising a memory 4, typical peripheral controllers 6, a mass storage controller 10, and a central processor 18; all coupled to a system bus 2. A disk adapter 12 is coupled to mass storage controller 10 and a plurality of disk devices 14 are coupled to the disk adapter 14.

FIG. 2a shows typical data streams made up of clock and data pulses. Data stream 20 is an example of frequency modulation recording (FM) and data stream 22 is an example of modified frequency modulation recording (MFM).

The solid lines indicate the actual wave shape of the data stream after the analog signals generated by the read head of the disk are digitized. The dotted lines indicate the timing positions of binary ZERO bits and clock bits that are not recorded on the modes.

FIG. 2b shows data streams of an address mark byte 24 in an FM mode of recording and an address mark byte 26 in an MFM mode of recording.

The FM and MFM coding schemes as well as the address mark byte codes are described in the aforementioned CDC document GA 21-9257-1 entitled, "IBM Two-Sided Diskette Original Equipment Manufacturers Information", Second Edition, November 1977.

Figure 3B:
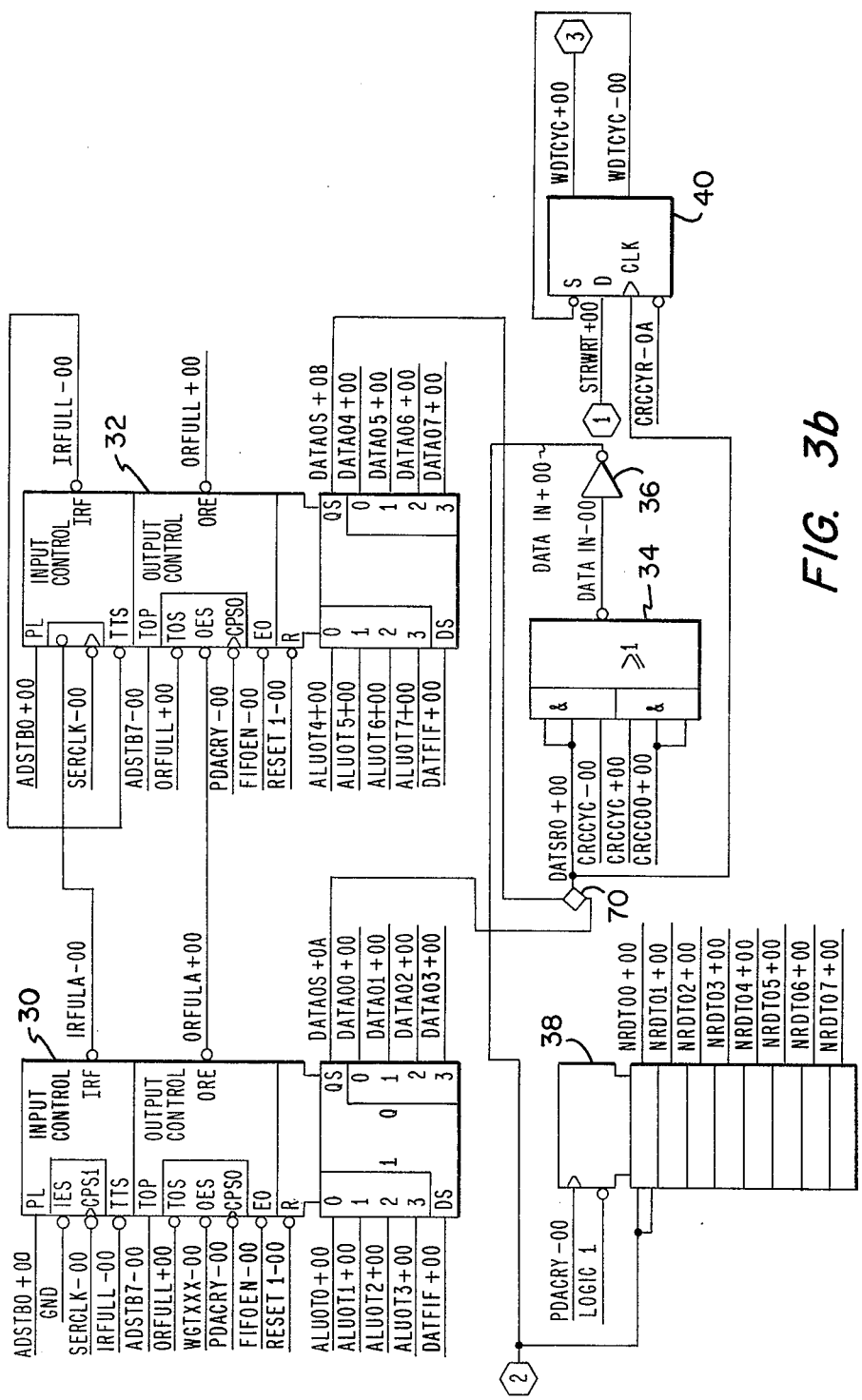

Referring to FIG. 3, information is received by the Disk Adapter 12 from the Controller 10 as an eight bit byte, data signals ALUOT0+00 through ALUOT7+00 which are applied to the data inputs of First In-First Out (FIFO) memories 30 and 32.

FIFO 30 and 32 memories are Fairchild 9403 FIRST-IN FIRST-OUT (FIFO) Buffer Memories and are described in the Macrologic Bipolar Microprocessor Data Book-Macro Logic published in 1976 by Fairchild, 464 Ellis St., Mountain View, California 94042 FIFO 30 and 32 memories have 16 memory locations of four bits at each location and operate as a stack. The memory locations are not separately addressable.

Logic signal ADSTBO+00 at logical ONE is applied to the parallel load (PL) input terminals of FIFO 30 and 32. This stores the input data signals ALUOT0+00 through ALUOT7+00 and transfers the data to the stack internal to FIFO 30 and 32 when output signal IRFULL−00 is forced to logical ZERO and subsequently applied to the TTS input terminals. The data will pass through the stack to the output register of FIFO 30 if the output register is empty. When the output register of FIFO 30 is full, logical signal ORFULA+00 is at logical ONE thereby inhibiting the output of FIFO 32. The serial output data signal DATAOS+0A is shifted out of output terminal QS of FIFO 30 through a wired OR gate 70, a AND/NOR gate 34, an inverter 36 and is loaded into a shift register 38 as data signal DATAIN+00 on the rise of timing signal PDACRY−00. When the four serial data bits have been shifted out of FIFO 30, logic signal ORFULA+00 goes to the logical ZERO and the four bits stored in FIFO 32 are shifted out as data signal DATOS+0B and shifted into shift register 38 through wired OR 70, AND/NOR gate 34 and inverter 36.

The output signal NRDTO1+00 through NRDTO6+00 are applied to the input address terminals of PROMs 60 and 62. These are Programmable Read Only Memory 93446 circuits.

PROM 60 output indicates data information to be written on the diskette surface and PROM 62 indicates clock information to be written on the diskette surface. The PROM 60 and 62 output clock and data signals are applied to the input of a shift register 64 and shifted out the MFMSR1+00 signal line to device 14. The formats on the diskette are written as specified by the IBM Two-Sided Diskette Original Equipment Manufacturers Information-GA 21-9257-1, Second Edition (November 1977), published by International Business Machines Corporation.

Assume initially that the device 14 requires data in the FM mode, that is, signal MFMXXX+00 at logical ZERO is applied to the address terminal 256 of PROMs 60 and 62. A plurality of bytes of hexadecimal 00, that is, eight data bits of zeros, is required to be written followed by the FM Address Mark 24, FIG. 2b, hexadecimal FE. The clock bits are coded as hexadecimal C7, having three mixing clocks.

As hexadecimal 00 bytes are received, signals ALUOTO+00 through ALUOT7+00 are at logical ZERO resulting in a stream of logical ZEROs shifting through shift register 38 thereby selecting address $0_{10}$ of PROMs 60 and 62. Referring to FIGS. 5 and 4 respectively, address location $0_{10}$ of PROM 62 has a $0010_2$ stored indicating a clock bit and address location $0_{10}$ of PROM 60 has a $0000_2$ stored indicating a binary ZERO data bit. The output of PROMs 60 and 62 are applied to the input of shift register 64 on successive PDACRY−00 cycles, i.e., every four microseconds. The shift register 64 is shifted by the write shift signal WRTSFT+00 every 500 nanoseconds. This provides successive clock pulses to the device 14 over signal line MFMSRI+00 every four microseconds.

The FM address mark 24, FIG. 2b, consists of seven data binary ONE bits and one binary ZERO bit, signals ALUOT0+00 through ALUOT7+00, which are loaded into FIFO 30 and 32.

Signal ALUOT0+00 at logical ONE is also applied to the D input terminal of a D-flop 50. The two input signals MYREST+00 and ACPCDS+00 at logical ONE are applied to the inputs of an AND gate 52. The output signal MYCD3X+00 is applied to the clock terminal of flop 50 which sets on the rise of signal ADPCD3+00 indicating that this is an address mark cycle. The flop 50 output signal AMKCYC is applied to the address terminal 128 of PROMs 60 and 62 thereby selecting address location $128_{10}$. Binary signals 1000 are read out of address location $128_{10}$ of PROM 60 forcing the start write signal STRWRT+00 to logical ONE conditioning a D-flop 40 to set when the first data bit of the address mark is received over signal line DATSTR+00 output of wired OR 70.

Similarly binary 0010 is read from address location $128_{10}$ of PROM 62 forcing the output signal MFMCLK+00 to logical ONE resulting in a clock signal being shifted out of shift register 64 over signal line MFMSR1+00.

The next data bit is read from address location $160_{10}$ of PROM 60 since logic signal NRDT01+00 is a logical ONE resulting in a readout binary 0010 forcing the output signal MFMDAT+00 to logical ONE resulting in a data bit at binary ONE being transferred to shift register 64.

Similarly binary 0010 indicating a clock bit is read from address location 160 of PROM 62. During the next cycle binary 0010 is read from address location $176_{10}$ of PROM 62 indicating a clock pulse and binary 0010 is read from address location $176_{10}$ indicating data bit of binary ONE.

On the next cycle binary 1000 is read from address location 184 of PROM 62 indicating a missing clock signal. The output signal MFMMCK+00 at logical ONE is applied to the input of an AND gate 66. At PDACRY+00 time the output signal MFMMCK+00 advances a counter 68 which will count the three missing clock pulses required for the address mark and reset flop 50 through an OR gate 42 and a NOR gate 44.

The missing clock signal MFMMCK+00 is at logical ONE for address locations 188 and 190 enabling the counter 68 to reset flop 50 after the third missing clock signal.

The output of PROM 60 from address locations 184, 188, 190 and 191 force binary ONE data bits into shift register 64.

As seen from FIG. 2b the MFM address mark has a missing clock after the fifth data bit. In that case input address terminals $256_{10}$, $128_{10}$, $32_{10}$, and $1_{10}$ are at logical ONE selecting the address locaton $417_{10}$ as the last data bit which is a binary ONE is shifted into the second position of shift register 38 forcing output signal NRDT01+00 to logical ONE. The previous binary ONE data bit is forcing output signal NRDT06+00 to logical ONE.

The MFM address mark 26 is shown in FIG. 2b. The data bit pattern is shown as hexadecimal A1 and the clock bit pattern is hexadecimal 0A with a missing clock appearing between the fourth and fifth data positions.

With data signal ALUOTO+00 at logical ONE indicating that the data bit zero position is a binary ONE flop 50 is set on the rise of the logic signal ADPCD3+00 input to an AND gate 52. Flop 50 output signal AMKCYC+00 at logical ONE sets the 128 address bit of PROMs 60 and 62. The 256 address bit of PROMs 60 and 62 are also set since the modified frequency modulation mode signal MFMXXX+00 is at logical ONE for the entire write sequence.

Binary 1000 is read from address location $384_{10}$ of PROM 60 indicating a start write operation. Logic signal STRWRT+00 at logical ONE conditions flop 40 to set on the rise of signal DATSRO+00 at the start of writing the address mark character. The flop 40 remains set while writing the address mark characters, data characters and the cyclic redundancy check characters and is reset by logic signal CRCCYR−0A at logical ZERO.

The generation of the cyclic redundancy check characters are not described in this embodiment since they are not part of the invention. The cyclic redundancy check bits are applied to shift register 38 via AND/NOR gate 34 and inverter 36 when logic signals CRCCYC+00 and CRCCOO+00 are at logical ONE.

When the 0 bit position of the address mark outputs shift register 38 as data signal NRDT03+00 at logical ONE, data signal NRDT01+00 is at logical ONE thereby selecting address location $424_{10}$ which causes a readout of binary 0010 from PROM 60 indicating a binary ONE in cell 0 and a readout of binary 000 from PROM 62 indicates the absence of a clock bit in cell 0. At the next PDACRY−00 clock time, data signals NRDT04+00 and NRDT02+00 are at logical ONE selecting address location $404_{10}$ of PROMs 60 and 62 indicating the absence of a clock bit and the absence of a data bit in cell 1.

At the next PRDACRY−00 clock time, data signals NRDT01+00 and NRDT03+00 are at logical ONE selecting address location $394_{10}$ of PROMs 60 and 62 indicating the absence of a clock bit and the presence of a binary ONE bit in cell 2.

At the next PDACRY−00 clock cycle, data signals NRDT06+00 and NRDT04+00 are at logical ONE selecting address location $389_{10}$ of PROMs 62 and 64 indicating the absence of both the clock and data bits in cell 3.

At the next PDACRY−00 clock signal, data signal NRDT05+00 is at logical ZERO selecting address location $386_{10}$ of PROMs 62 and 64 indicating the presence of a clock bit and the absence of a data bit in cell 4.

At the next PDACRY−00 clock cycle, data signals NRDT01+00 and NRDT06+00 are at logical ONE selecting address location $417_{10}$ of PROMs 62 and 64 indicating the missing clock bit and the absence of a data bit in cell 5. The contents of cells 6 and 7 are determined as described supra.

The missing clock signal MFMMCK+00 is generated to advance counter 68. Since during the MFM mode, three address marks are generated, counter 68 is advanced on each address mark in order to reset flop 50 while the third address mark is being written.

When writing information on the inner cylinders diskette in the MFM mode the device requires the logic to precompensate for the shift in information on the media. That is, depending on the bit pattern being written, bits will be written 125 nanoseconds early, normally or 125 nanoseconds late. This precompensation when writing enables the reading of the information to be accomplished at a lower error rate than if there were no precompensation. As an example, assume the writing of a binary data pattern of 00110000. When the first binary ZERO is outputted on signal line NRDT00+00 of shift register 38, signal NRDT01+00 is at logical ONE and address location $352_{10}$ of PROMs 60 and 62 are selected. Signals PCMXXX+00 are at logical ONE.

PROM 62 outputs binary 0010 from address location $352_{10}$ indicating a normal clock bit, and the PROM 60 outputs binary 0000 from address location $325_{10}$ indicating a data bit of binary ZERO. On the next cycle, address location $368_{10}$ of PROMs 60 and 62 is selected indicating an early clock bit and a binary ZERO data bit. Logic signal MFMECK+00 is at logical ONE and is applied to shift register 64 one position earlier than does the normal clock signal MFMCLK+00.

On the next cycle, address location 344 of PROMs 60 and 62 is selected indicating the absence of a clock bit and a late binary ONE data bit. Output signal MFMLDT+00 is at logical ONE and is applied to shift register 64 one position later than the normal data signal MFMDAT+00.

On the next cycle, address location 332 of PROMs 60 and 62 is selected indicating the absence of a clock bit and an early binary ONE data bit. Output signal MFMEDT+00 is at logical ONE and is applied to shift register 64 one position earlier than the normal data signal MFMDAT+00. On subsequent cycles, address locations $326_{10}$, $323_{10}$, $321_{10}$, and $320_{10}$ are selected indicating binary ZERO data bits and no clock, late clock, early clock and normal clock bits respectively.

FIG. 4 shows the start write or data bits stored in each address location of PROM 60.

Address locations 0 through $255_{10}$ are addressed when processing in the FM mode and address locations $256_{10}$ through $511_{10}$ are addressed when processing in the MFM mode.

The data bit in column 0 at binary ONE indicates that an early data bit (125 nanoseconds early) signal MFMEDT+00 is to be written. The data bit in column 1 at binary ONE indicates that a normal data bit, signal MFMDAT+00, is to be written. The data bit in column 2 at binary ONE indicates that a late data bit (125 nanoseconds late) signal MFMLDT+00 is to be written. The bit in column 3 at logical ONE, signal STRWRT+00, indicates that the write data cycle operation will start if the first data bit at binary ONE was outputted from FIFO 30. FIG. 5 shows the clock or missing clock bits stored in each address location of PROM 62.

Address locations $0_{10}$ through $255_{10}$ are addressed during the FM mode and address location $256_{10}$ through $511_{10}$ are addressed during the MFM mode.

Columns 0, 1, and 2 of PROM 62 stores the early, normal and late clock bits which are applied to shift register 64 over signal lines MFMECK+00 MFMCLK+00 and MFMLCK+00 respectively.

Column 3 stores binary bits indicating over signal line MFMMCK+00 than an address mark with a missing clock is being processed.

FIGS. 6a and 6b show a typical operation where writing information is the MFM mode. Referring to FIG. 6a the clock signal CLKSIG+00 is a 250 nanosecond free-running clock applied to the clock input terminal of counter 54. The PDACRY−00 is a 250 nanosecond negative going pulse every four microseconds during the FM mode and every two microseconds during the MFM mode.

The data bit outputs FIFO 30 over signal line DATAOS+OA on the fall of the PDACRY−00 pulse and is loaded into shift register 38 on the next rise of the PDACRY−00 pulse. The output signals NRDT01+00 through NRDT06+00 are applied to the address terminals of PROMs 60 and 62. The output is loaded into shift register 64 and appears on the MFMSRI+00 signal line as clock and data bits. If signal NRDT01+00 is at logical ONE, address location $288_{10}$ is selected thereby writing a clock bit.

Referring to FIG. 6b, three write cycles are shown as a data bit as binary ONE is shifted through shift register 38 on successive PDACRY−00 cycles resulting in clock bits being written in cells 0 and 1 and a data bit being written in cell 2. Address locations 288, 272, and 264 are selected on successive cycles.

| LOGIC CIRCUITS IN THE PREFERRED EMBODIMENT | |
| --- | --- |
| Counter 54 | 74 S169 |
| Shift Register 38 | 74 LS164 |
| Shift Register 64 | 74 166 |
| Counter 68 | 74 LS195 |
| D Flop 40,50 | 74 LS74 |

| LOGIC CIRCUITS IN THE PREFERRED EMBODIMENT —continued | |
| --- | --- |
| Multiplexer 58 | 74 LS157 |

These logic circuits are described in "The TTL Data Book for Design Engineers" Second Edition, Texas Instruments, Copyright 1976.
First In-First Out Memory 30,32 9403 was described supra.
Read Only Memory 60-62 93446 is described in the Bipolar Memory Data Book published in 1977 by Fairchild, 464 EllisStreet, Mountain View, California, 94042.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same results and fall within the spirit of the claimed invention. It is the intention, therefore, to limit the invention only as indicated by the scope of the claims.

What is claimed is:

1. A system for writing digital information on a media in either a frequency modulation (FM) mode or a modified frequency modulation (MFM) mode comprising:
    a. buffer memory means for storing said digital information;
    b. first shift register means coupled to said buffer memory means for receiving said digital information serially and providing parallel output signals as said digital information shifts through said shift register means;
    c. read only means coupled to said first shift register means and responsive to said parallel output signals for generating clock signals and data signals;
    d. second shift register means coupled to said read only means and responsive to said clock and said data signals for generating said digital information for writing on said media; and,
    e. address mark cycle means coupled to said read only means and responsive to a missing clock signal for generating an address mark signal in a first state for selecting said clock and said data signals indicative of said address mark.

2. The system of claim 1 further comprising:
    a. start write means coupled to said read only means and responsive to a start write signal and said serial digital information for generating a write data cycle signal indicating that said digital information is to be written on said media.

3. The system of claim 2 wherein said read only memory means comprises:
    a. a read only memory having a plurality of address locations, a plurality of address location input terminals and a plurality of output terminals, said address terminals being responsive to said output signals, said address mark signal, and a modified frequency modulation signal for selection of said address location containing binary bits representative of said clock signal, said data signal, said start write signal and said missing clock signal being applied to said output terminals.

4. The system of claim 3 wherein said address terminals of said read only memory further responsive to a precompensation signal for selecting said address locations containing binary bits representative of early and late clock and data signals in accordance with a predetermined pattern of said serial digital information.

5. The system of claim 4 wherein said start means comprises:

a. a first bistable circuit element being conditioned by said start write signals in a first state to set when said first bistable circuit elements sense a rise of a signal indicative of a said serial information, thereby indicating that said digital information is to be written on said media and to reset when a reset signal is applied to a reset terminal indicating said digital information and a plurality of cyclic redundancy check characters are written on said media.

6. The system of claim 5 wherein said mark cycle means comprises:

a. counting means coupled to said read only memory means and responsive to a predetermined number of said missing clock signals for generating an address mark cycle signal;

b. a second bistable circuit element coupled to said counting means and generating said address mark signal in said first state when said second bistable circuit element is set by said digital information, said second bistable circuit element being reset by said address mark cycle signal thereby generating said address mark signal in said second state.

7. The system of claim 6 wherein said predetermined number of said missing clock signals is three.

* * * * *